(12) United States Patent
Zhong

(10) Patent No.: US 12,075,923 B2
(45) Date of Patent: Sep. 3, 2024

(54) CHILD SEAT

(71) Applicant: Wonderland Switzerland AG, Steinhausen (CH)

(72) Inventor: Zhiren Zhong, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/373,320

(22) Filed: Sep. 27, 2023

(65) Prior Publication Data

US 2024/0016307 A1  Jan. 18, 2024

Related U.S. Application Data

(60) Continuation of application No. 17/987,765, filed on Nov. 15, 2022, now Pat. No. 11,800,938, which is a continuation of application No. 17/167,255, filed on Feb. 4, 2021, now Pat. No. 11,793,325, which is a division of application No. 16/387,257, filed on Apr. 17, 2019, now Pat. No. 10,945,534.

(30) Foreign Application Priority Data

Apr. 23, 2018 (CN) .......................... 201810368423.7

(51) Int. Cl.
*A47D 1/00* (2006.01)
*A47D 1/02* (2006.01)
*A47D 15/00* (2006.01)
*B62B 9/10* (2006.01)
*B62B 9/12* (2006.01)
*B62B 9/24* (2006.01)

(52) U.S. Cl.
CPC .............. *A47D 1/006* (2013.01); *A47D 1/02* (2013.01); *A47D 15/006* (2013.01); *B62B 9/102* (2013.01); *B62B 9/12* (2013.01); *B62B 9/24* (2013.01); *B62B 2202/42* (2013.01); *B62B 2205/30* (2013.01)

(58) Field of Classification Search
CPC ........ A47D 1/02; A47D 1/006; A47D 15/006; B62B 9/102; B62B 9/12
See application file for complete search history.

(56) References Cited

U.S. PATENT DOCUMENTS

2017/0313339 A1* 11/2017 Ruggiero ................ B62B 7/105
2018/0027989 A1*  2/2018 Pos .......................... A47D 1/06

FOREIGN PATENT DOCUMENTS

| EP | 2832625 A2 * | 2/2015 | ............. B62B 7/142 |
| EP | 3090659 A1 * | 11/2016 | ............. A47D 1/002 |
| WO | WO-2018051202 A1 * | 3/2018 | ............. B62B 7/062 |

* cited by examiner

*Primary Examiner* — Anthony D Barfield
(74) *Attorney, Agent, or Firm* — NZ CARR LAW OFFICE

(57) ABSTRACT

A child seat includes a seat portion, a backrest frame, a connector, and a locking mechanism operable to rotationally lock and unlock the connector with respect to the seat portion. The seat portion is fixedly connected with a first coupling part. The backrest frame is fixedly connected with a second coupling part, the second coupling part being pivotally connected with the first coupling part about a first pivot axis so that the backrest frame is rotatable relative to the seat portion. The connector is pivotally connected with the seat portion about a second pivot axis spaced apart from the first pivot axis, the connector being operable to detachably engage with a corresponding structure provided on a child supporting apparatus.

20 Claims, 22 Drawing Sheets

CHILD SEAT

CROSS-REFERENCE TO RELATED APPLICATION(S)

This application is a continuation application of U.S. patent application Ser. No. 17/987,765 filed on Nov. 15, 2022, now U.S. Pat. No. 11,800,938, which is a continuation application of U.S. patent application Ser. No. 17/167,255 filed on Feb. 4, 2021, now U.S. Pat. No. 11,793,325, which is a divisional application of U.S. patent application Ser. No. 16/387,257 filed on Apr. 17, 2019 that issued as U.S. patent Ser. No. 10/945,534, which claims priority to China patent application no. 201810368423.7 filed on Apr. 23, 2018.

BACKGROUND

1. Field of the Invention

The present invention relates to child seats.

2. Description of the Related Art

Various juvenile products are available on the market for facilitating care and transport of young children. For example, a child stroller may be typically used to transport a child outdoor. The child stroller generally has a seat portion, a backrest and a front guard. During use, the front guard can be erected to forwardly restrain a child sitting on the child stroller, and the backrest frame may be deployed for supporting a child's back. When the child stroller is unused, the front guard and the backrest may be folded to reduce the size of the child stroller for convenient storage.

In certain child strollers, the seat portion, the backrest and the front guard may be assembled as a detachable seat that can be installed and removed from the child stroller. Because the detachable seat is generally not coupled to the stroller frame for folding and unfolding movements, a caregiver usually has to separately fold and unfold the detachable seat. As a result, more operating steps are required, which may undesirably complicate the folding and unfolding of the child stroller.

Therefore, there is a need for an improved design that is more convenient to operate, and can address at least the foregoing issues.

SUMMARY

The present application describes a child seat that is convenient to fold and unfold. According to one embodiment, the child seat includes a seat portion, a backrest frame, a connector, and a locking mechanism operable to rotationally lock and unlock the connector with respect to the seat portion. The seat portion is fixedly connected with a first coupling part. The backrest frame is fixedly connected with a second coupling part, the second coupling part being pivotally connected with the first coupling part about a first pivot axis so that the backrest frame is rotatable relative to the seat portion. The connector is pivotally connected with the seat portion about a second pivot axis spaced apart from the first pivot axis, the connector being operable to detachably engage with a corresponding structure provided on a child supporting apparatus.

DETAILED DESCRIPTION OF THE EMBODIMENTS

Figure 1:
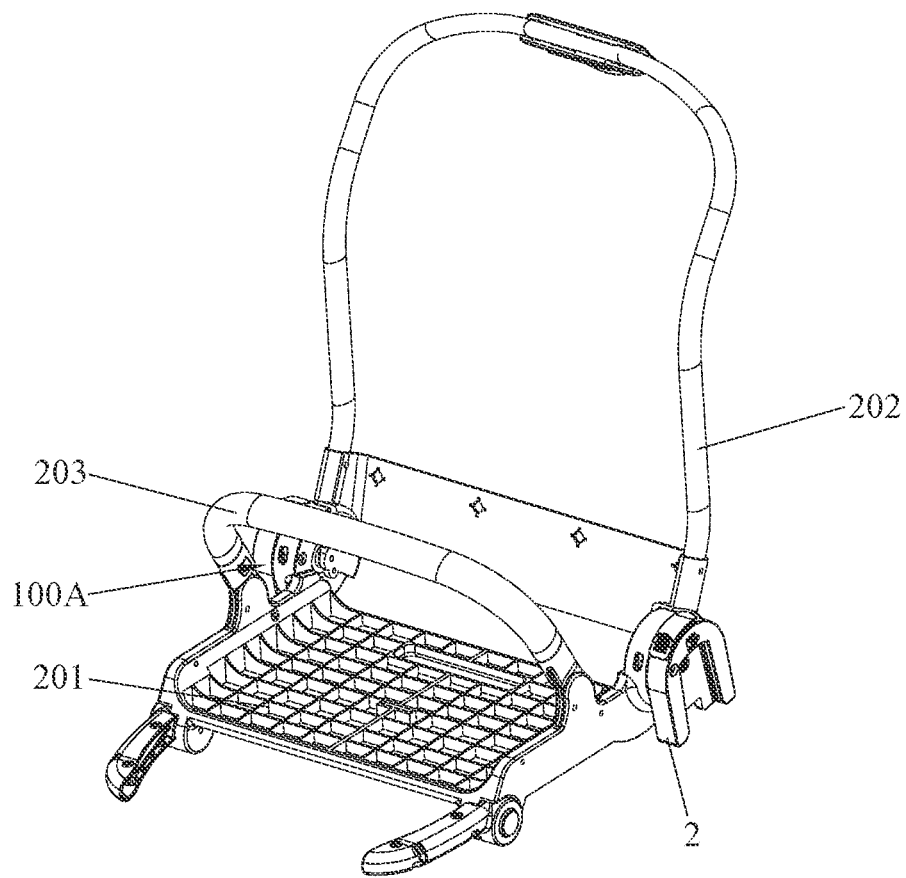
FIG. 1 is a perspective view illustrating an embodiment of a child seat.
Figure 2:
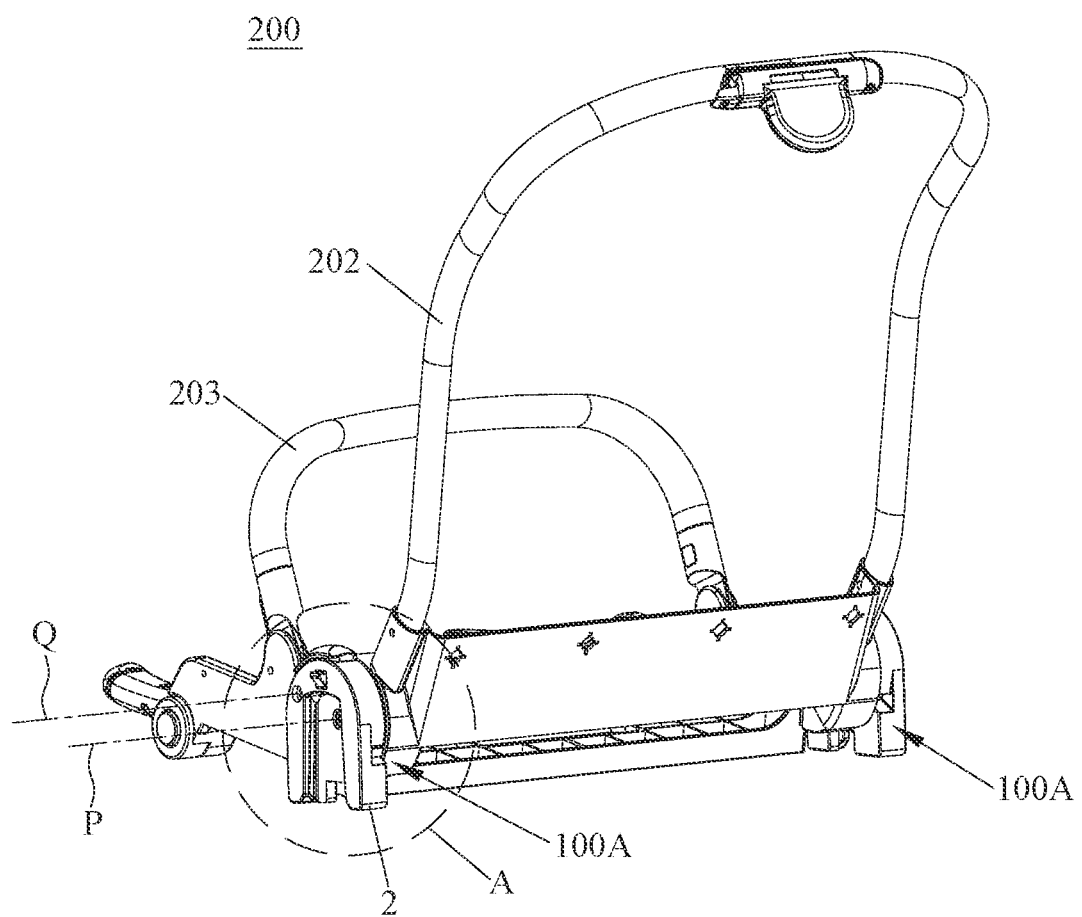
FIG. 2 is another perspective view of the child seat shown in FIG. 1.
Figure 3:
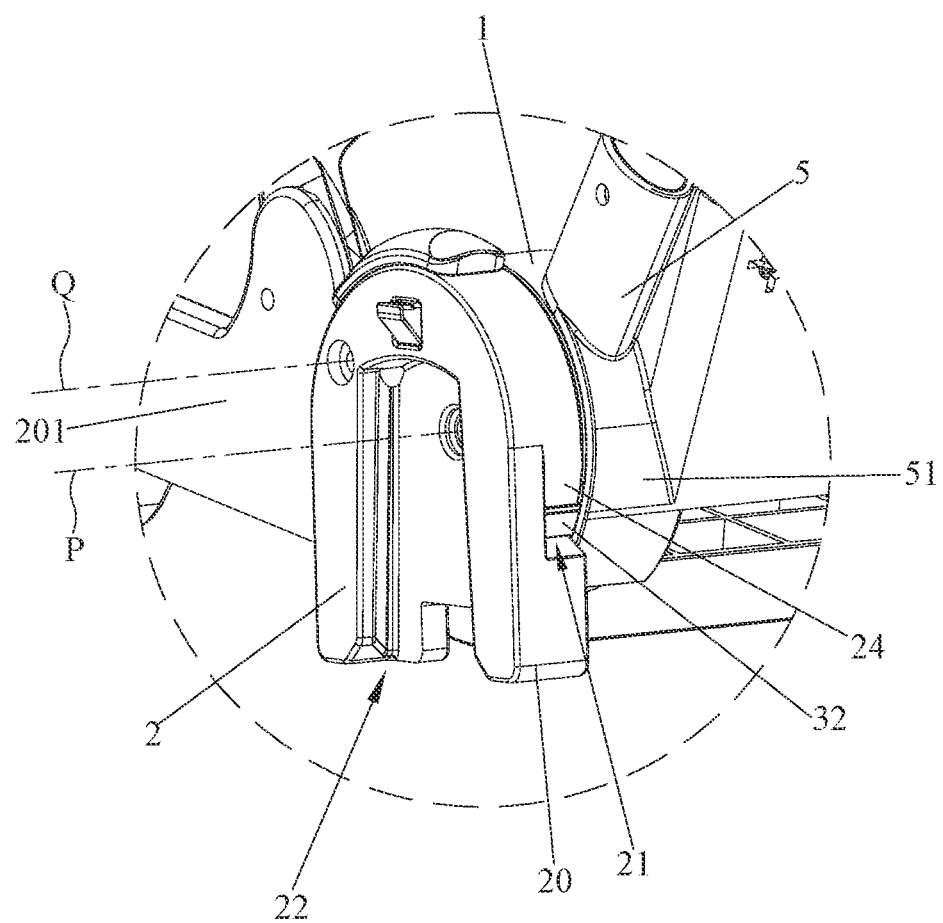
FIG. 3 is an enlarged view of portion A shown in FIG. 2.

FIGS. 1 and 2 are two perspective views illustrating an embodiment of a child seat 200 detachably installable on a child supporting apparatus. FIG. 3 is an enlarged view of portion A shown in FIG. 2. Referring to FIGS. 1-3, the child seat 200 can include a seat portion 201, a backrest frame 202 and a front guard 203. The seat portion 201 can be configured to receive a child, and can be respectively assembled with the backrest frame 202 and the front guard 203.

The backrest frame 202 may be pivotally connected with the seat portion 201 about a pivot axis P. According to an example of construction, the seat portion 201 can be respectively connected fixedly with two coupling parts 1 at the left and right sides, and the backrest frame 202 can have two side end portions respectively connected fixedly with two other coupling parts 5 that are respectively connected pivotally with the two coupling parts 1 of the seat portion 201 about the pivot axis P. The coupling parts 1 may be formed integrally with the seat portion 201, or fixedly attached to the seat portion 201 via fasteners. At each of the left and right sides, the coupling part 5 of the backrest frame 202 can be pivotally connected with the coupling part 1 of the seat portion 201 at an inner side of the coupling part 1. The front guard 203 can extend transversally above the seat portion 201, and can be pivotally connected with the seat portion 201 at the left and right sides thereof. Each of the backrest frame 202 and the front guard 203 is thereby rotatable relative to the seat portion 201 for folding and unfolding the child seat 200. For example, the backrest frame 202 and the front guard 203 may be rotated forward toward a front of the seat portion 201 for folding the child seat 200, and may be rotated rearward to unfold the child seat 200 for use. Moreover, the backrest frame 202 may be adjusted to different positions relative to the seat portion 201 for providing various sitting configurations, e.g., an upright sitting position or a recline position.

Referring to FIGS. 1-3, the child seat 200 can further include two connectors 2 respectively provided at a left and a right side of the seat portion 201 for detachably engaging with two corresponding structures provided on a child supporting apparatus (not shown). The two connectors 2 can be pivotally connected with the seat portion 201 about a pivot axis Q that extends transversally from the left to the right side of the seat portion 201 and is spaced apart from the pivot axis P of the backrest frame 202. For example, each connector 2 can include a housing 20 that is pivotally connected with the seat portion 201 about the pivot axis Q. More specifically, the housing 20 of each connector 2 may be pivotally connected with the corresponding coupling part 1 at an outer side thereof. At each of the left and right sides, the coupling part 1 of the seat portion 201 thus can be disposed between the connector 2 and the coupling part 5 of the backrest frame 202. The housing 20 of each connector 2 can have an outer side provided with an insert opening 22 adapted to detachably engage with a corresponding structure provided on a child supporting apparatus. The child seat 200 can be thereby installed and removed as desired on the standing frame of the child supporting apparatus. Examples of child supporting apparatuses that can receive the installation of the child seat 200 can include, without limitation, child strollers, highchairs, and the like.

The seat portion 201, the backrest frame 202 and the two connectors 2 are rotatable relative to one another when the child seat 200 is adjusted between an unfolded state and a folded state. When the child seat 200 is installed on a child supporting apparatus with the connectors 2 engaged with the standing frame of the child supporting apparatus, the child seat 200 can be configured to the unfolded state for receiving a child with the backrest frame 202 unfolded for supporting the child's back. In the folded state, the backrest frame 202 can be folded toward the front of the seat portion 201 to reduce the size of the unused child seat 200 for convenient storage. The child seat 200 may be switched between the unfolded state and the folded state by rotating the backrest frame 202. Moreover, the seat portion 201 may rotate relative to the two connectors 2 when the backrest frame 202 is adjusted between the unfolded state and the folded state. For example, when the backrest frame 202 is in the unfolded state, each of the two connectors 2 can be disposed in a first angular position relative to the seat portion 201 with the insert opening 22 of the connector 2 oriented in a direction substantially perpendicular to the seat portion 201. When the backrest frame 202 is turned to the folded state, each of the two connectors 2 can be moved to a second angular position relative to the seat portion 201 with the insert opening 22 of the connector 2 tilted an angle and displaced forward relative to the first angular position. This may provide a more compact folded size that can facilitate storage of a child supporting apparatus with the child seat 200 installed thereon.

In conjunction with FIGS. 1-3, FIG. 4 is a cross-sectional view illustrating further construction details of the child seat 200. Referring to FIGS. 1-4, the child seat 200 can include two locking mechanisms 100A operable to lock and unlock the two connectors 2 with respect to the seat portion 201. The two locking mechanisms 100A provided at the left and right sides may have a same construction and operate in a same way. Each locking mechanism 100A can be operatively connected with the backrest frame 202 so that a rotation of the backrest frame 202 in a folding direction causes the locking mechanism 100A to unlock the corresponding connector 2, and a rotation of the backrest frame 202 in an unfolding direction causes the locking mechanism 100A to lock the connector 2 with respect to the seat portion 201. Accordingly, the locking mechanism 100A can lock the corresponding connector 2 in position relative to the seat portion 201 when the child seat 200 is in the unfolded state, and unlock the connector 2 for relative rotation between the seat portion 201 and the connector 2 as the backrest frame 202 rotates from the unfolded state to the folded state. According to an embodiment, each locking mechanism 100A can include a latching device 3, a spring 4 and an actuating part 51.

Figure 8:
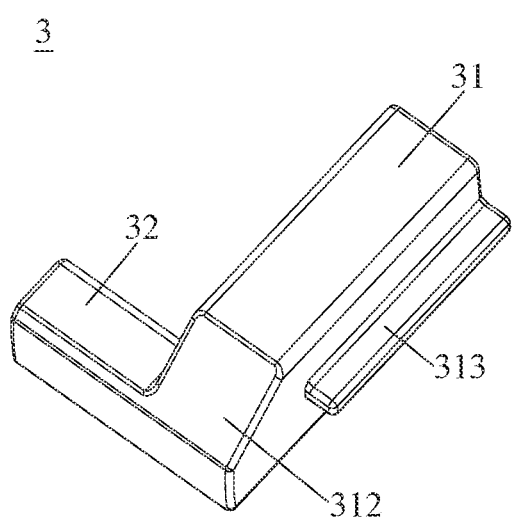
FIG. 8 is a perspective view illustrating a latching device used in the locking mechanism shown in FIG. 4.

In conjunction with FIGS. 1-4, FIG. 8 is a perspective view illustrating an embodiment of the latching device 3. Referring to FIGS. 1-4 and 8, the latching device 3 is slidably connected with the coupling part 1, and can slide relative to the coupling part 1 between a locking position where the latching device 3 is engaged with the housing 20 of the connector 2 and an unlocking position where the latching device 3 is disengaged from the housing 20 of the connector 2. For example, the coupling part 1 can include a guide slot 11, and the latching device 3 can be disposed for sliding movement along the guide slot 11. The guide slot 11 may exemplary open on an outer surface 10 of the coupling part 1, and the latching device 3 may be exposed on the outer surface 10 of the coupling part 1. According to an example of construction, the latching device 3 can include a stem portion 31 and a locking portion 32 fixedly connected with each other, the locking portion 32 protruding at a side of the stem portion 31, as shown in FIG. 8. The latching device 3 including the stem portion 31 and the locking portion 32 may be formed integrally as a single part. When the latching device 3 is assembled with the coupling part 1, the stem portion 31 may be slidably received in the guide slot 11, and the locking portion 32 can protrude sideways outside the guide slot 11 and toward the connector 2. Moreover, the stem portion 31 may have a rib 313 extending lengthwise that is slidably engaged with a slit 111 provided on an inner sidewall of the guide slot 11 to assist in restrictedly positioning the latching device 3 with respect to the coupling part 1. The latching device 3 may be thereby assembled to be slidable along an axis X substantially orthogonal to the respective pivot axes P and Q of the backrest frame 202 and the connector 2 between the locking position and the unlocking position.

Figure 4:
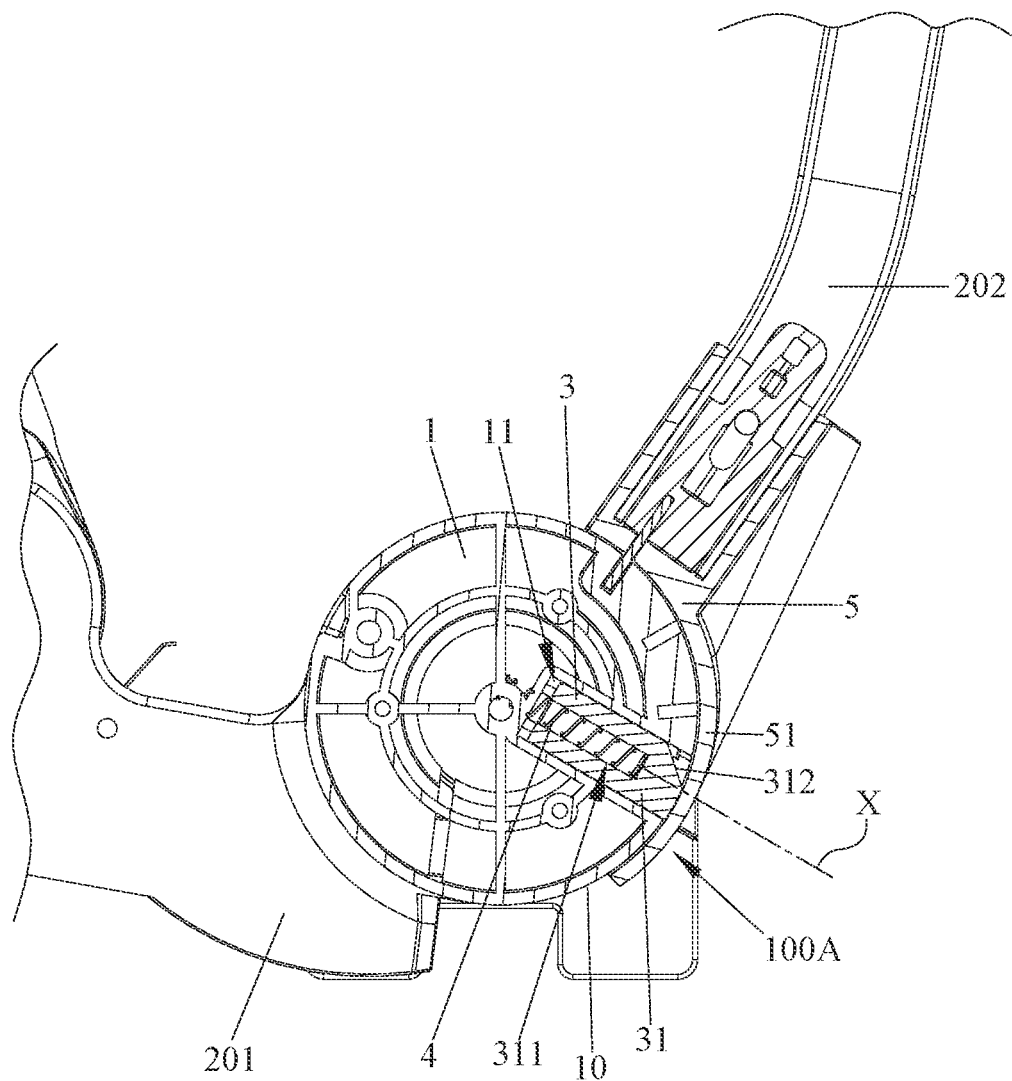
FIG. 4 is a cross-sectional view illustrating an embodiment of a locking mechanism operable to lock and unlock a connector in the child seat, the locking mechanism being shown in a locking position.
Figure 5:
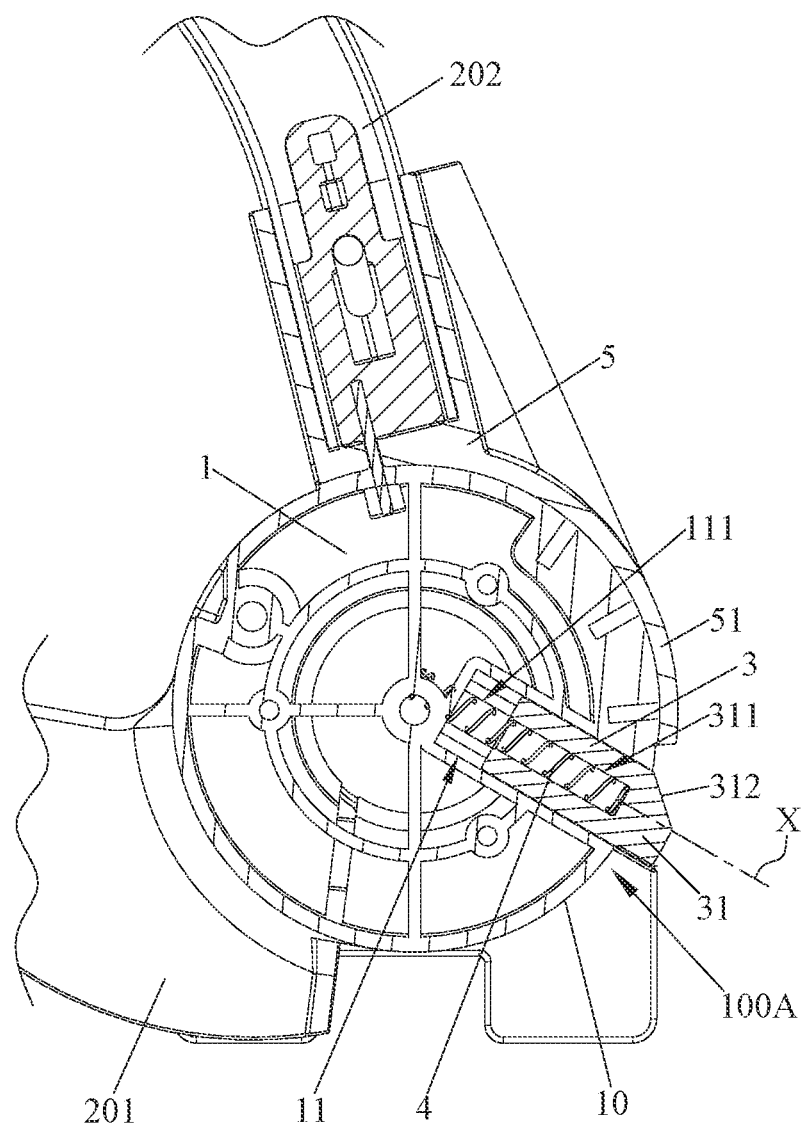
FIG. 5 is a cross-sectional view illustrating the locking mechanism shown in FIG. 4 in an unlocking position.
Figure 6:
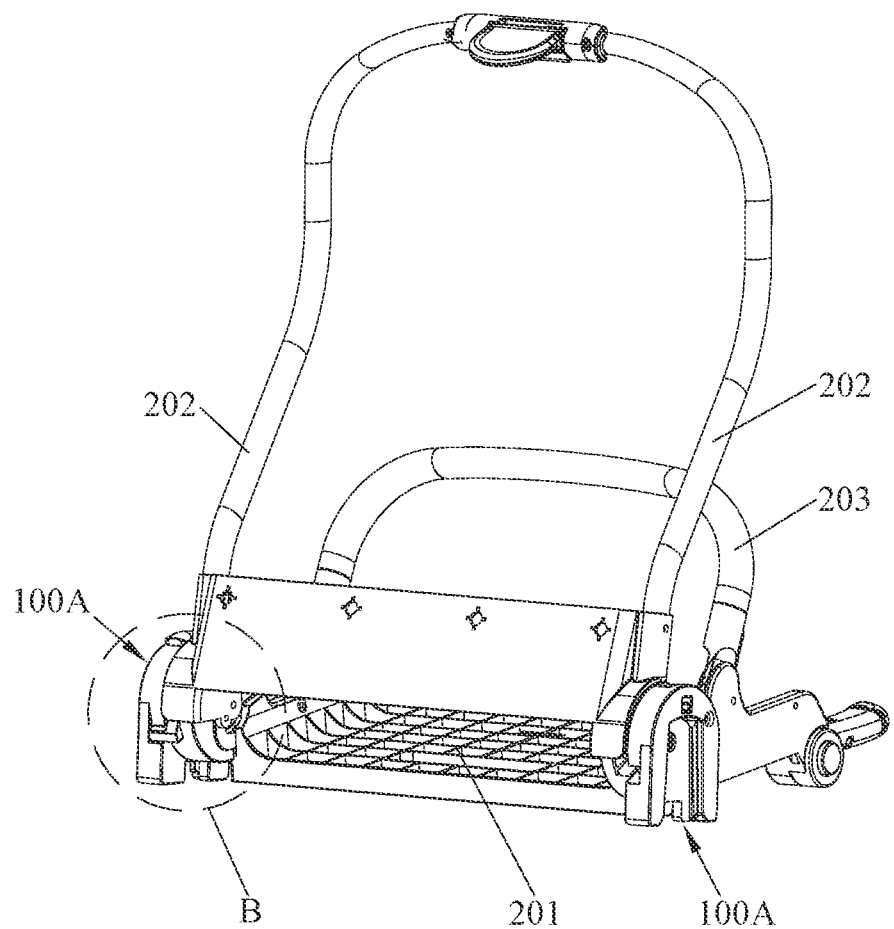
FIG. 6 is a perspective view illustrating the child seat with a backrest frame rotated in a folding direction for unlocking the locking mechanism shown in FIG. 4.
Figure 7:
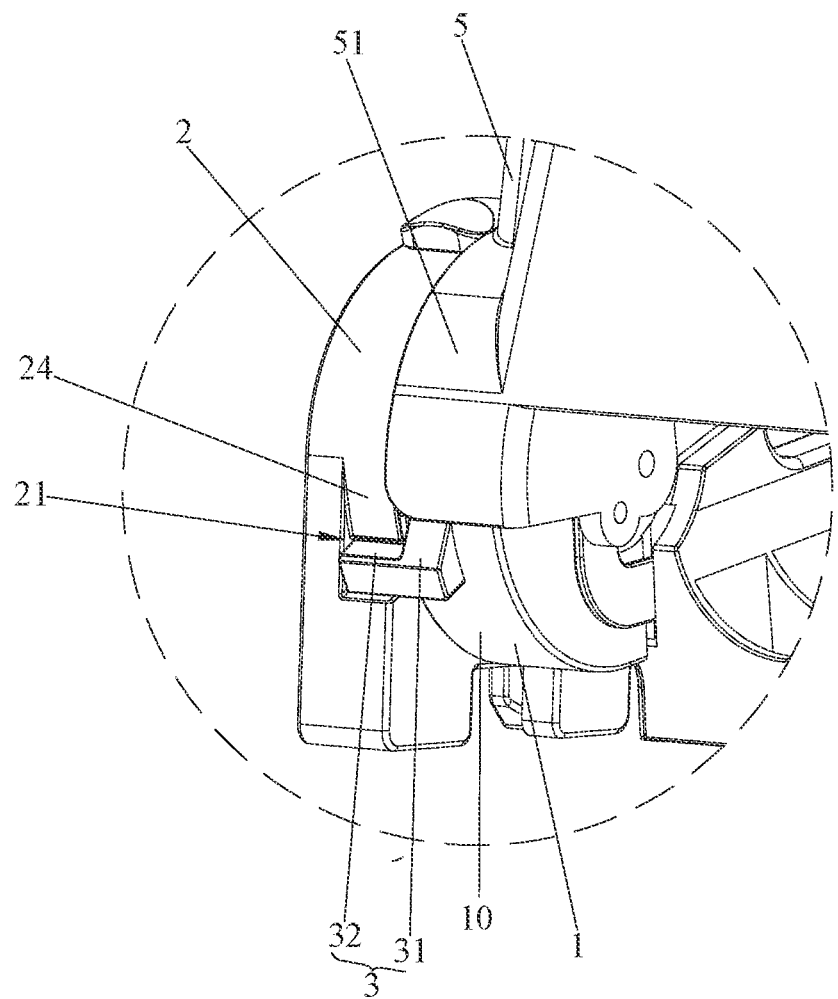
FIG. 7 is an enlarged view of portion B shown in FIG. 6.

Referring to FIGS. 3 and 4, the housing 20 of the connector 2 can be disposed adjacent to the guide slot 11 of the coupling part 1, and can have an opening 21 on an outer surface 24 of the housing 20. The locking portion 32 of the latching device 3 can engage with the opening 21 in the locking position, and disengage from the opening 21 in the unlocking position. In particular, the latching device 3 can slide along the axis X toward the interior of the guide slot 11 for engaging the locking portion 32 with the opening 21 of the housing 20, and slide along the axis X to protrude outside the guide slot 11 for disengaging the locking portion 32 from the opening 21 of the housing 20. FIGS. 3 and 4 show the latching device 3 in the locking position, and FIGS. 5-7 show the latching device 3 in the unlocking position.

The engagement of the latching device 3 with the opening 21 of the housing 20 can lock the connector 2 in the first angular position relative to the seat portion 201 corresponding to the unfolded state of the child seat 200. When the latching device 3 is disengaged from the opening 21 of the housing 20, the connector 2 may rotate between the first and second angular positions relative to the seat portion 201. The second angular position of the connector 2 relative to the seat portion 201 may be exemplary set when the backrest frame 202 is in the folded state.

According to an embodiment, the connector 2 may remain unlocked when it is in any angular position other than the first angular position corresponding to the unfolded state of the backrest frame 202. For example, the locking portion 32 of the latching device 3 disengaged from the opening 21 may be in sliding contact with the outer surface 24 of the housing 20 during rotation of the connector 2 relative to the seat portion 201. According other embodiments, the housing 20 of the connector 2 may include multiple openings, and the latching device 3 may engage with any one of the multiple openings for locking the connector 2 in different angular positions relative to the seat portion 201.

Referring to FIG. 4, the spring 4 may be respectively connected with the latching device 3 and an inner sidewall of the coupling part 1, and can bias the latching device 3 toward the unlocking position. For example, the stem portion 31 of the latching device 3 may include a cavity 311, and the spring 4 may have two opposite ends respectively connected with a sidewall inside the cavity 311 and a sidewall inside the guide slot 11.

Referring to FIGS. 1-4, the actuating part 51 may be fixedly connected with the coupling part 5 of the backrest frame 202 so that the actuating part 51, the coupling part 5 and the backrest frame 202 can rotate in unison relative to the coupling part 1 of the seat portion 201 and the connector 2. More specifically, the actuating part 51 can move between a hold state corresponding to the unfolded state of the backrest frame 202 and a release state corresponding to a folding of the backrest frame 202. FIGS. 2-4 illustrate the actuating part 51 in the hold state, and FIGS. 5-7 illustrate the actuating part 51 in the release state. In the hold state, the actuating part 51 can hold the latching device 3 in the locking position against the biasing force of the spring 4 so as to keep the connector 2 locked in the first angular position. In the release state, the actuating part 51 allows the latching device 3 to move to the unlocking position under the biasing force of the spring 4 for unlocking the connector 2.

According to an example of construction, the actuating part 51 may have a curved shape, and may be disposed for movement along the outer surface 10 of the coupling part 1. When the actuating part 51 is in the hold state, the actuating part 51 can at least partially cover the opening of the guide slot 11 on the coupling part 1 and contact with the latching device 3, e.g., at a distal end of the stem portion 31 and/or an outer edge of the locking portion 32 of the latching device 3. The hold state of the actuating 51 can thereby retain the latching device 3 in the locking position against the biasing force of the spring 4. When the actuating part 51 is moved to the release state by a folding rotation of the backrest frame 202, the actuating part 51 can be displaced away from the latching device 3 so that the latching device 3 can be urged by the spring 4 to the unlocking position disengaged from the opening 21 of the housing 20.

Moreover, a movement of the actuating part 51 from the release state to the hold state can cause the actuating part 51 to push against the latching device 3 so that the latching device 3 is urged to move from the unlocking position to the locking position. For example, the latching device 3 may have a ramp 312, and the actuating part 51 moving from the release state toward the hold state can push against the ramp 312 so as to urge the latching device 3 to move from the unlocking position to the locking position. Accordingly, the latching device 3 may be switched from the unlocking position to the locking position by simply rotating the backrest frame 202 to the unfolded state.

Figure 9:
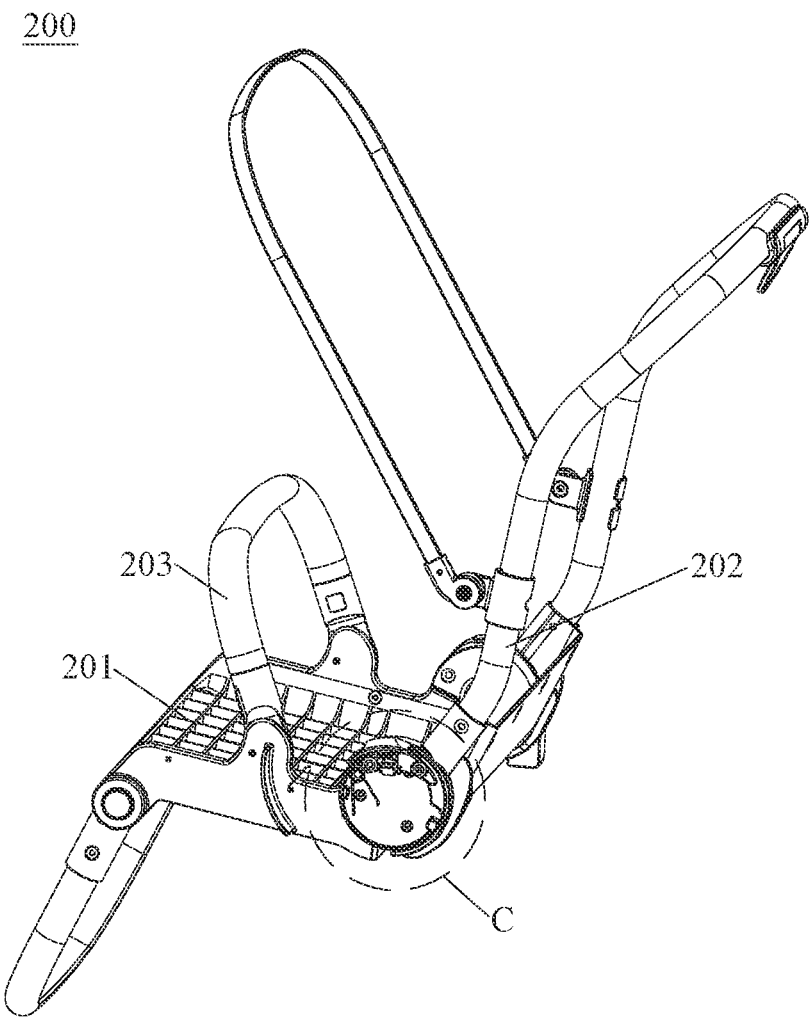
FIG. 9 is a perspective view illustrating further construction details provided in an embodiment of a child seat.
Figure 10:
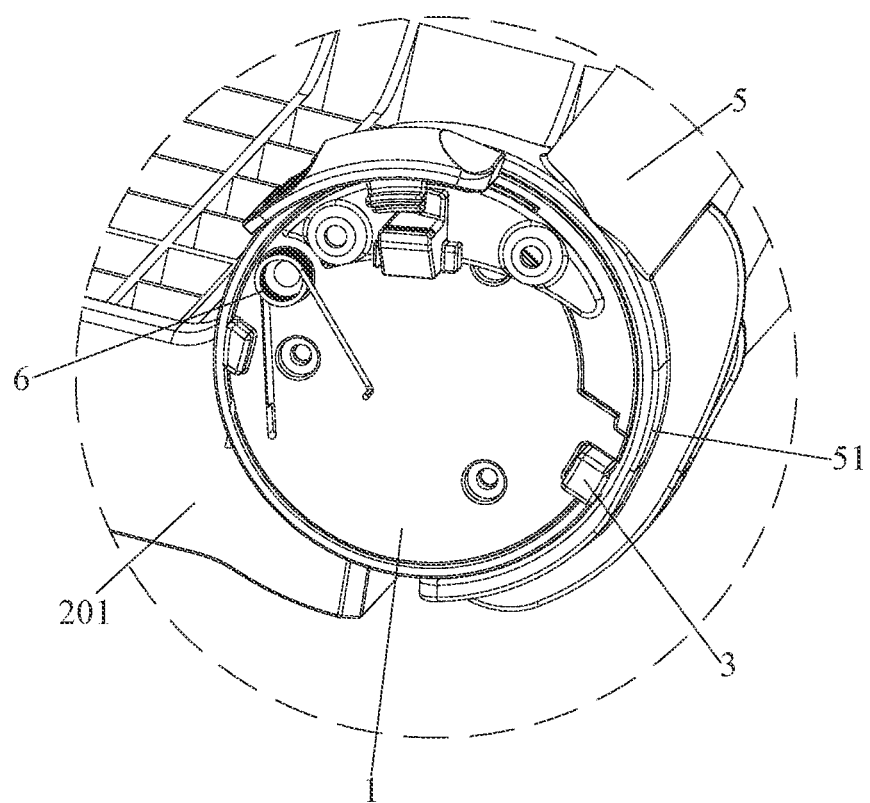
FIG. 10 is an enlarged view of portion C shown in FIG. 9.
Figure 11:
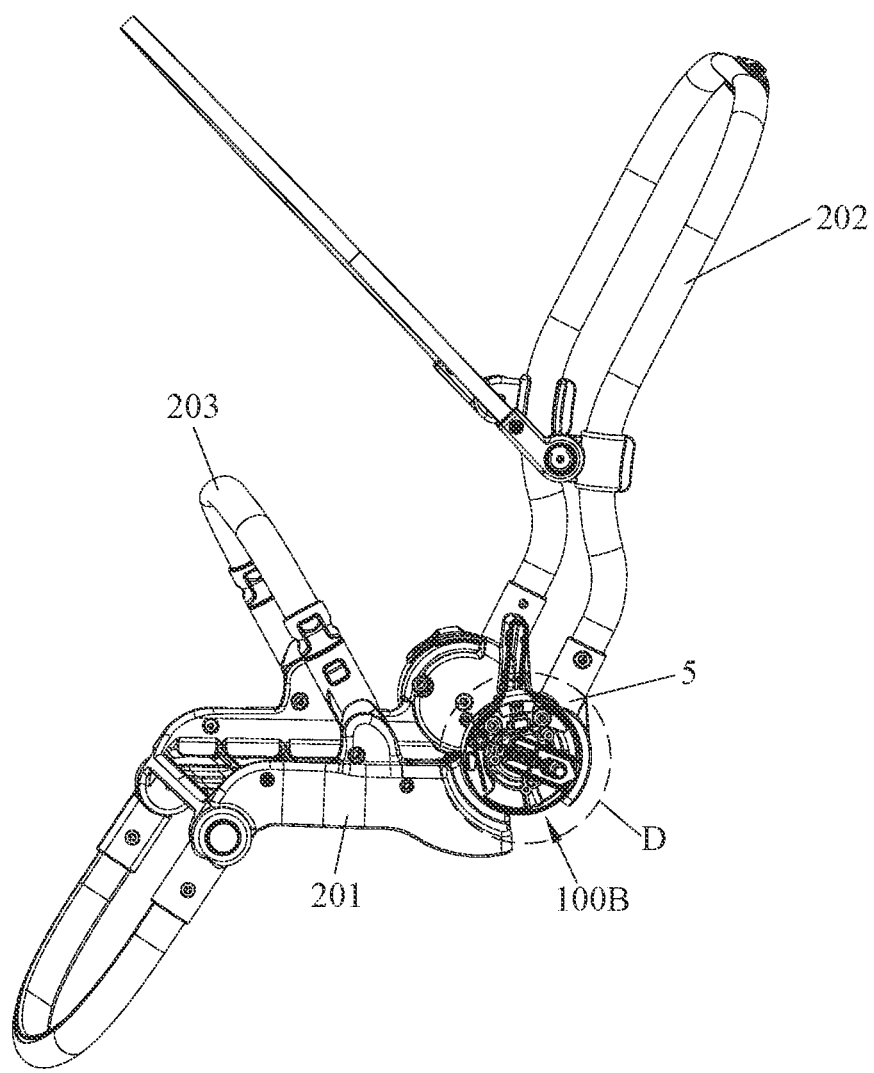
FIG. 11 is a perspective view illustrating an embodiment of a child seat provided with a variant construction of a locking mechanism operable to lock and unlock a connector.
Figure 12:
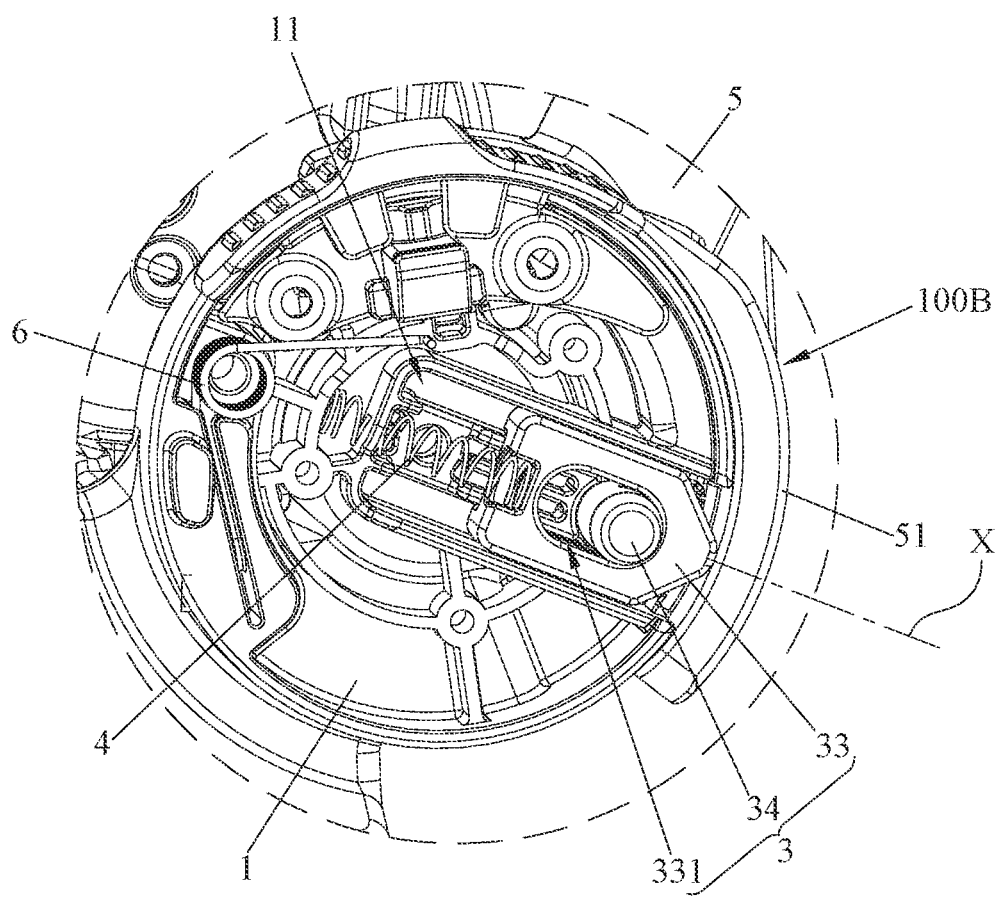
FIG. 12 is an enlarged view of portion D shown in FIG. 11 illustrating further construction details of the locking mechanism.
Figure 13:
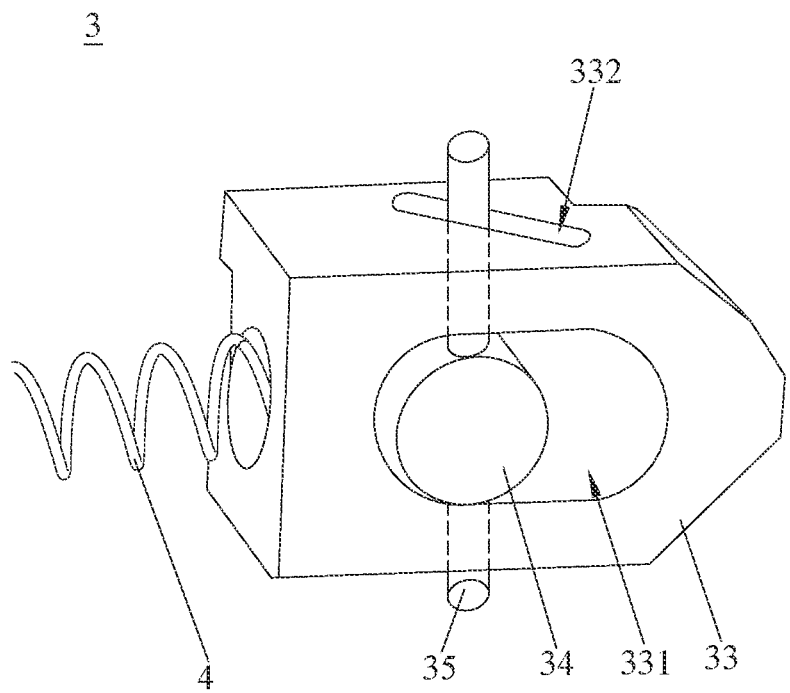
FIG. 13 is a schematic view illustrating a latching device used in the locking mechanism shown in FIGS. 11 and 12.
Figure 14:
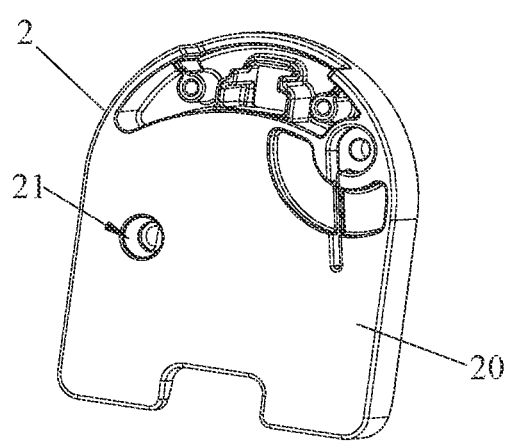
FIG. 14 is a schematic view illustrating a housing of a connector used in the child seat shown in FIG. 11.
Figure 15:
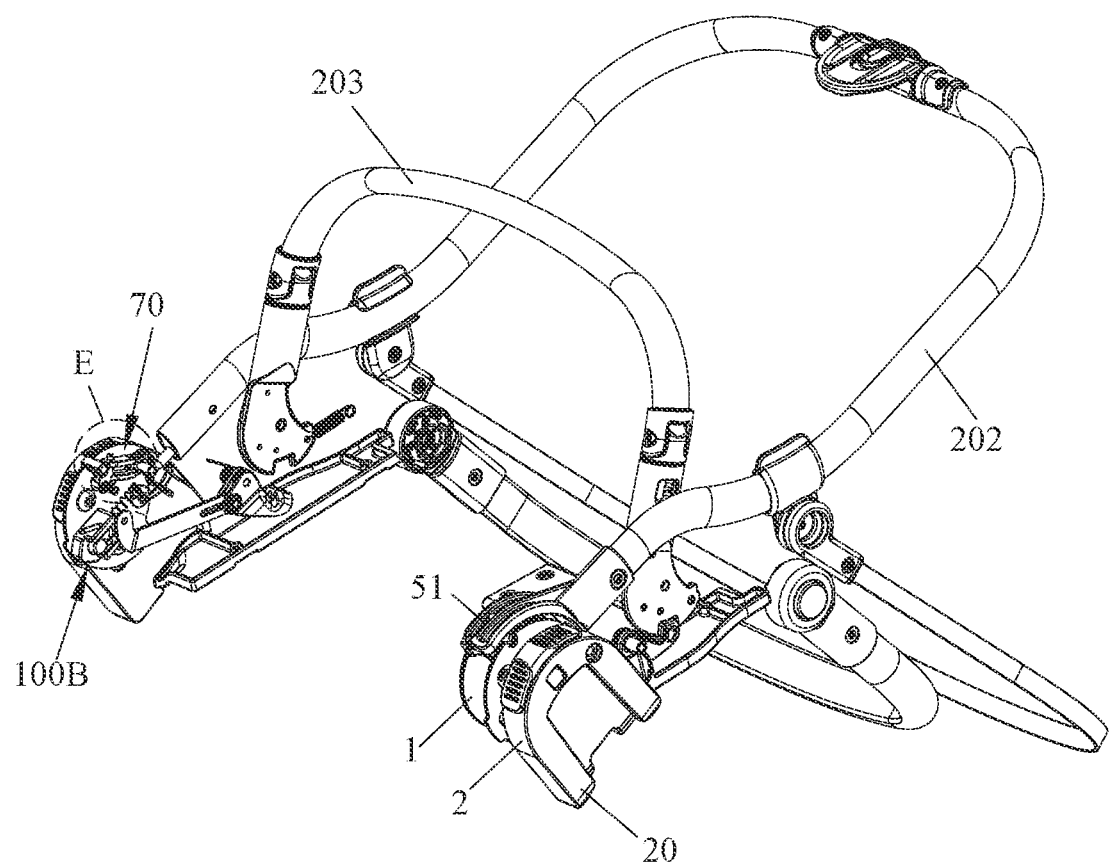
FIG. 15 is a perspective view illustrating an embodiment of a child seat provided with a coupling mechanism operable to movably couple a seat portion to a backrest frame of the child seat.
Figure 16:
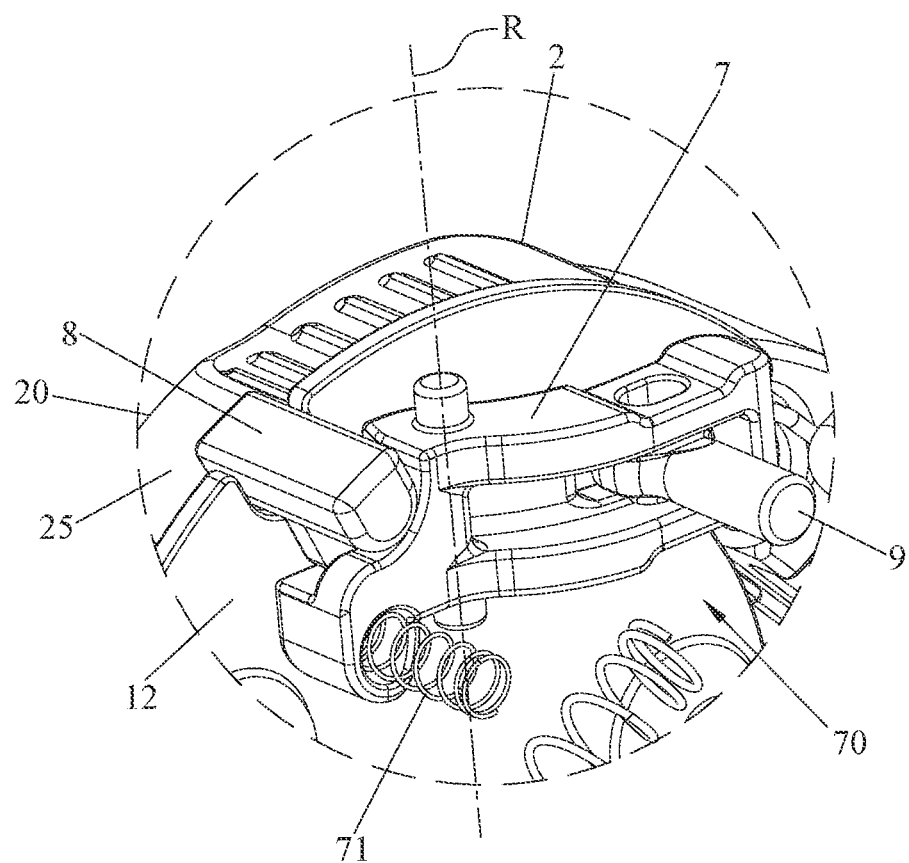
FIG. 16 is an enlarged view of portion E shown in FIG. 15 illustrating further construction details of the coupling mechanism.

Referring to FIGS. 9 and 10, the child seat 200 may further include a spring 6 operable to bias the connector 2 toward the first angular position relative to the seat portion 201 when the backrest frame 202 is unfolded for use. For example, the spring 6 may be a torsion spring, and may have two ends respectively connected with the coupling part 1 of the seat portion 201 and the housing 20 of the connector 2. The spring 6 may be loaded when the backrest frame 202 is in the folded state and the connector 2 in the second angular position relative to the seat portion 201. When the child seat 200 is unfolded by rotating the backrest frame 202 rearward, the spring 6 can apply a biasing force that assists the connector 2 to rotate relative to the seat portion 201 and the backrest frame 202 from the second angular position to the first angular position. This may facilitate unfolding of the child seat 200.

Although the spring 6 has been described as applying a biasing force for assisting the connector 2 to rotate from the second angular position to the first angular position, it will be appreciated that the spring 6 may alternatively be configured to assist the connector 2 to rotate from the first angular position to the second angular position, which may facilitate folding of the child seat 200.

Exemplary operation of the aforementioned child seat 200 is described hereinafter with reference to FIGS. 1-10. When the backrest frame 202 is in the unfolded state, the connector 2 at each of the left and right sides can be locked in the first angular position relative to the seat portion 201 by the latching device 3. Like described previously, the latching device 3 can be kept in the locking position by the actuating part 51. As the backrest frame 202 is rotated in the folding direction toward the front of the seat portion 201, the actuating part 51 moves away from and releases the latching device 3, which can be urged to move from the locking position to the unlocking position by the spring 4. The connector 2 can be thereby unlocked with respect to the seat portion 201, and the seat portion 201 and the connector 2 can rotate relative to each other for facilitating collapsing of the child seat 200. When the backrest frame 202 is in the folded state, the connector 2 can be set in the second angular position relative to the seat portion 201 with the insert opening 22 of the connector 2 tilted an angle and displaced forward relative to the first angular position.

To unfold the child seat 200, the backrest frame 202 can be rotated in the unfolding direction toward the rear of the seat portion 201, and the connector 2 can be rotated from the second angular position to the first angular position relative to the seat portion 201. As the backrest frame 202 rotates toward the unfolded state, the actuating part 51 can move and push against the ramp 312 of the latching device 3, which is consequently urged to move from the unlocking position to the locking position. The latching device 3 can thereby engage and lock the connector 2 in the first angular position.

FIGS. 11-14 are various schematic views illustrating a variant construction of a locking mechanism 100B that may be applied in an embodiment of the child seat 200. The locking mechanism 100B may be provided in an embodiment of the child seat 200 that pivotally assembles the backrest frame 202 and the connectors 2 to the seat portion 201 in a similar manner as previously described. Referring to FIGS. 11-14, the locking mechanism 100B is operatively connected with the backrest frame 202, and includes a latching device 3, a spring 4 and an actuating part 51. The latching device 3 of the locking mechanism 100B is slidably connected with the coupling part 1 of the seat portion 201, and includes a stem portion 33, a locking portion 34 and a pin 35.

Referring to FIGS. 11-14, the stem portion 33 can be disposed for sliding movement along the guide slot 11 of the coupling part 1, and can have a mount cavity 331 and at least a driving slit 332. The axis X of sliding movement of the stem portion 33 can be substantially orthogonal to the respective pivot axes of the backrest frame 202 and the connector 2, like previously described. The locking portion 34 can be fixedly connected with the pin 35, and can be movably received at least partially in the mount cavity 331 of the stem portion 33 with the pin 35 slidably guided through the driving slit 332. The driving slit 332 may have an elongate shape, and may be tilted an angle relative to the axis of sliding movement of the stem portion 33. For example, the tilt angle between the driving slit 332 and the axis of sliding movement of the stem portion 33 may be about 45 degrees. The stem portion 33 and the locking portion 34 can be thereby coupled to each other via a sliding connection allowing the locking portion 34 to slide relative to the stem portion 33 and the coupling part 1 for protruding or retracting at a side of the stem portion 33. For example, the locking portion 34 can slide along an axis substantially orthogonal to the axis X of sliding movement of the stem portion 33. With this assembly, the stem portion 33 can slide toward the interior of the guide slot 11 to urge the locking portion 34 to slide and protrude at a side of the stem portion 33 for engaging with an opening 21 (better shown in FIG. 14) provided on the housing 20 of the connector 2, and can slide toward the outside of the guide slot 11 to urge the locking portion 34 to slide and retract toward the stem portion 33 for disengaging from the opening 21 of the housing 20. The opening 21 can be provided on a side of the housing 20 facing the coupling part 1 of the seat portion 201. The latching device 3 thereby configured can have a locking position in which the locking portion 34 of the latching device 3 is engaged with the opening 21 of the housing 20 to lock the connector 2 in the first angular position corresponding to the unfolded state of the child seat 200, and an unlocking position in which the locking portion 34 of the latching device 3 is disengaged from the opening 21 of the housing 20 for relative rotation between the connector 2 and the seat portion 201.

Referring to FIGS. 11-14, the spring 4 may be respectively connected with the stem portion 33 of the latching device 3 and an inner sidewall of the coupling part 1, and can bias the latching device 3 toward the unlocking position.

In the embodiment of FIGS. 11-14, the actuating part 51 can be fixedly connected with the coupling part 5 of the backrest frame 202 so that the actuating part 51, the coupling part 5 and the backrest frame 202 can rotate in unison relative to the coupling part 1 of the seat portion 201 and the connector 2. Like previously described, the actuating part 51 can move between a hold state corresponding to the unfolded state of the backrest frame 202 and a release state corresponding to a folding of the backrest frame 202. In the hold state, the actuating part 51 can contact with the stem portion 33 of the latching device 3 and keep the latching device 3 in the locking position against the biasing force of the spring 4 for locking the connector 2 in the first angular position relative to the seat portion 201. When the actuating part 51 is moved to the release state, the actuating part 51 can be displaced away from the stem portion 33 of the latching device 3 so that the latching device 3 can be urged by the spring 4 to the unlocking position disengaged from the opening 21 of the housing 20.

Like previously described, the stem portion 33 of the latching device 3 may have a ramp, and the actuating part 51 moving from the release state toward the hold state can push against the ramp so as to urge the latching device 3 to move from the unlocking position to the locking position. Accordingly, the latching device 3 may be switched from the unlocking position to the locking position by rotating the backrest frame 202 to the unfolded state.

FIGS. 15-18 are various views illustrating construction details of a coupling mechanism 70 that may be provided in an embodiment of the child seat 200. Referring to FIGS. 15-18, the child seat 200 may further include a coupling mechanism 70 operable to movably couple the seat portion 201 to the backrest frame 202 so that the seat portion 201 and the backrest frame 202 can move in unison relative to the connector 2 during adjustment of the backrest frame 202 between the unfolded state and the folded state. The coupling mechanism 70 may be provided in an embodiment of the child seat 200 that pivotally assembles the backrest frame 202 and the connectors 2 to the seat portion 201 in a similar manner as previously described. More specifically, the coupling mechanism 70 may be assembled with the coupling part 1 of the seat portion 201, and include a linking part 7, a spring 71 and a release actuator 8. According to an example of construction, the coupling part 1 can include a cover 12 and a casing portion 13 fixedly attached to each other, the housing 20 of the connector 2 pivotally connected with the coupling part 1 can be disposed adjacent to the cover 12, and the linking part 7 and the release actuator 8 can be received at least partially in an interior of the casing portion 13.

Figure 17:
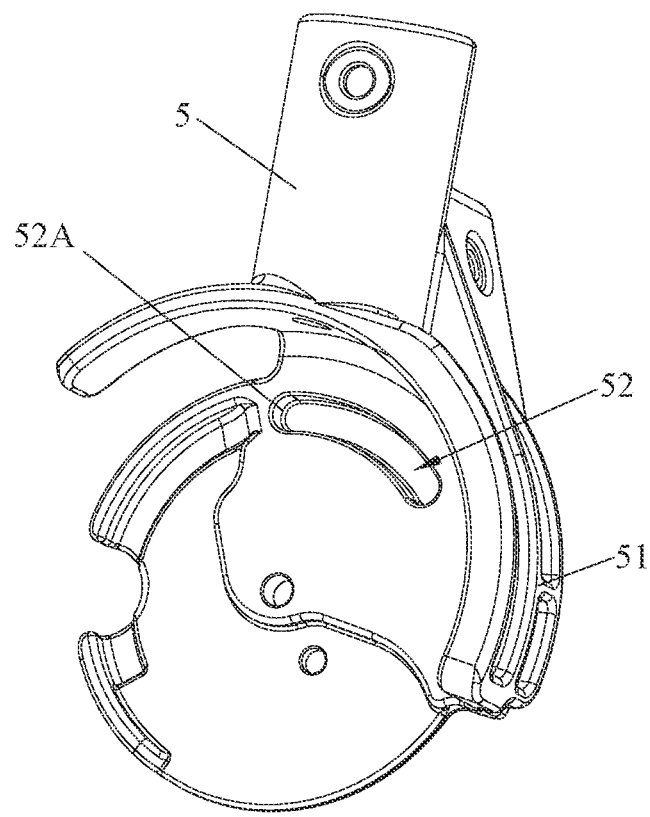
FIG. 17 is a perspective view illustrating a coupling part of a backrest frame used in the coupling mechanism shown in FIGS. 15 and 16.
Figure 18:
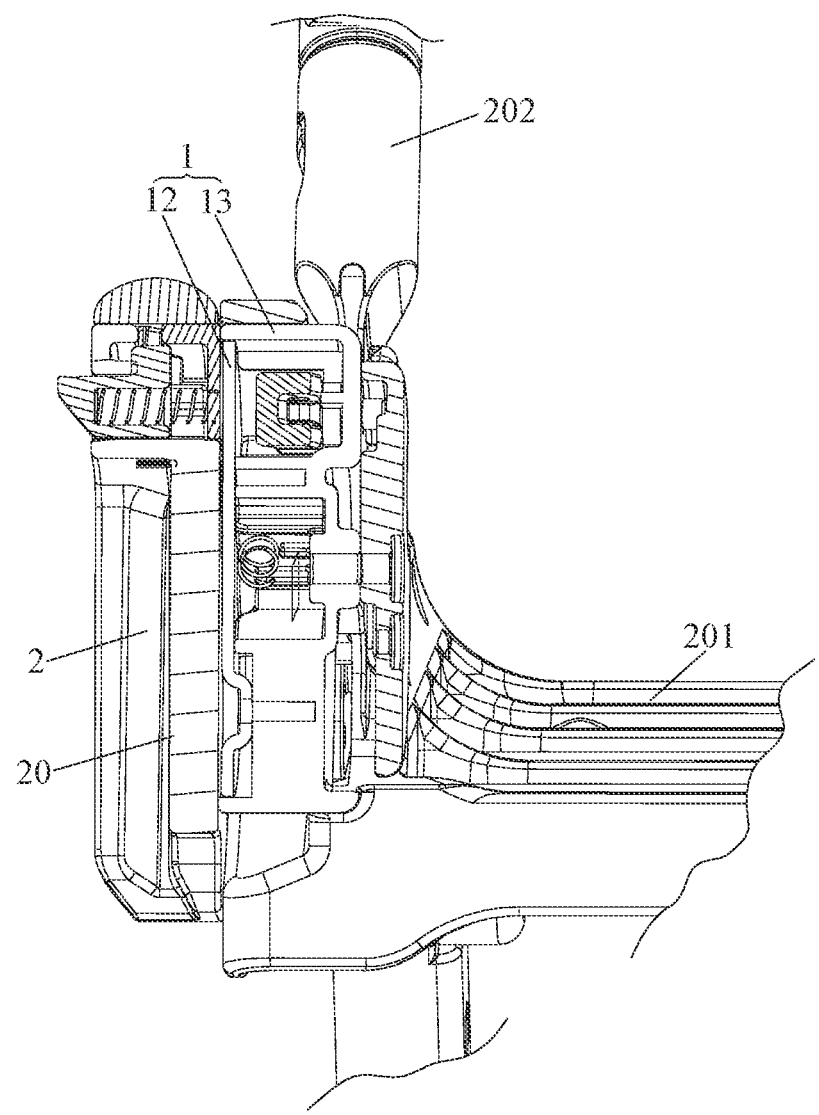
FIG. 18 is a cross-sectional view illustrating the assembly of the backrest frame and the connector with the seat portion.

The linking part 7 may be pivotally connected with the casing portion 13 or the cover 12 of the coupling part 1 about a pivot axis R, and can have a protruding portion 9 projecting toward the coupling part 5 of the backrest frame 202. The protruding portion 9 may be exemplary attached fixedly to the linking part 7. The pivot axis R of the linking part 7 may be substantially orthogonal to the pivot axis of the backrest frame 202, and the protruding portion 9 may be attached to the linking part 7 at a location distant from the pivot axis R. The linking part 7 thereby assembled can rotate with the coupling part 1 and the seat portion 201 relative to the connector 2. Moreover, the linking part 7 is rotatable about the pivot axis R relative to the coupling part 1 between a coupling-enabled state where the protruding portion 9 can engage with the coupling part 5 for movably coupling the seat portion 201 to the backrest frame 202, and a decoupling state where the protruding portion 9 is disengaged from the coupling part 5 for decoupled rotation of the backrest frame 202 relative to the seat portion 201. According to an example of construction, the coupling part 5 can include a channel 52 having a curved shape as shown in FIG. 17, and the protruding portion 9 can be partially received in the channel 52 in the coupling-enabled state and displaced outside the channel 52 in the decoupling state.

The spring 71 is configured to bias the linking part 7 toward the coupling-enabled state. According to an example of construction, the spring 71 may be a compression spring, and may have two opposite ends respectively connected with the linking part 7 and the casing portion 13 of the coupling part 1.

Referring to FIGS. 15-18, the release actuator 8 can be slidably connected with the coupling part 1, and can protrude outside the coupling part 1 through an opening provided in the cover 12. According to an example of construction, the release actuator 8 and the protruding portion 9 may be placed at two sides of the pivot axis R. The release actuator 8 may be urged by a contact with the connector 2 to slide relative to the coupling part 1 and push the linking part 7 to rotate from the coupling-enabled state to the decoupling state against the biasing force of the spring 71.

Figure 19:
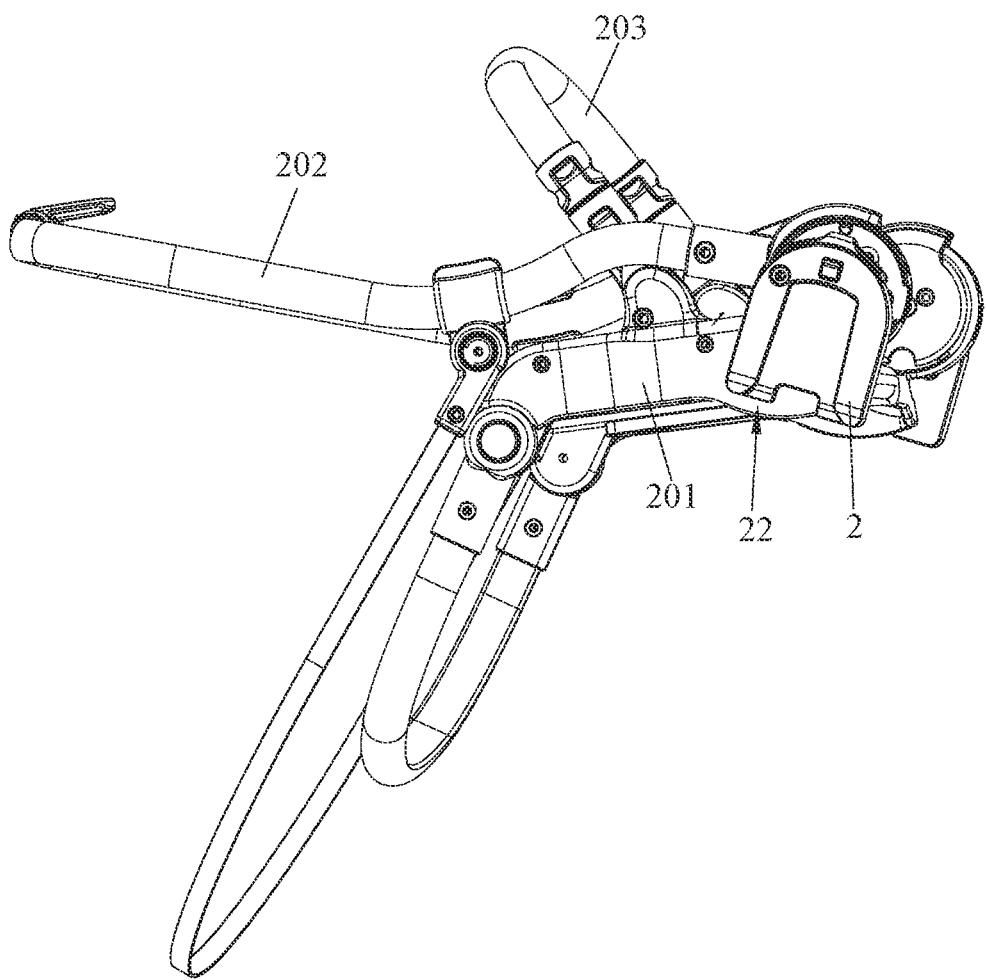
FIG. 19 is a perspective view illustrating the child seat shown in FIG. 15 with the backrest frame in a folded state and the connector in a second angular position relative to the seat portion.

Exemplary operation of the coupling mechanism 70 in the child seat 200 is described hereinafter with reference to FIGS. 15-20. Suppose that the child seat 200 is initially in the folded state with the backrest frame 202 collapsed toward the front of the seat portion 201 as shown in FIG. 19. In the folded state, the latching device 3 is in the unlocking position, the connector 2 can be set in the second angular position relative to the seat portion 201, and the linking part 7 can be in the coupling-enabled state with the protruding portion 9 partially received in the channel 52. The child seat 200 in the folded state may be exemplary provided on a child stroller (not shown) with the connectors 2 respectively engaged with corresponding structures provided on the child stroller.

For unfolding the child seat 200, the backrest frame 202 can be rotated relative to the seat portion 201 in the unfolding direction toward the rear of the seat portion 201. As a result, the coupling part 5 can move along with the backrest frame 202 in the unfolding direction relative to the coupling portion 1 of the seat portion 201, which can result in a relative displacement of the protruding portion 9 along the channel 52 toward an end 52A of the channel 52. The linking part 7 can remain in the coupling-enabled state as the end 52A of the channel 52 moves along with the backrest frame 202 toward the protruding portion 9 of the linking part 7.

Figure 20:
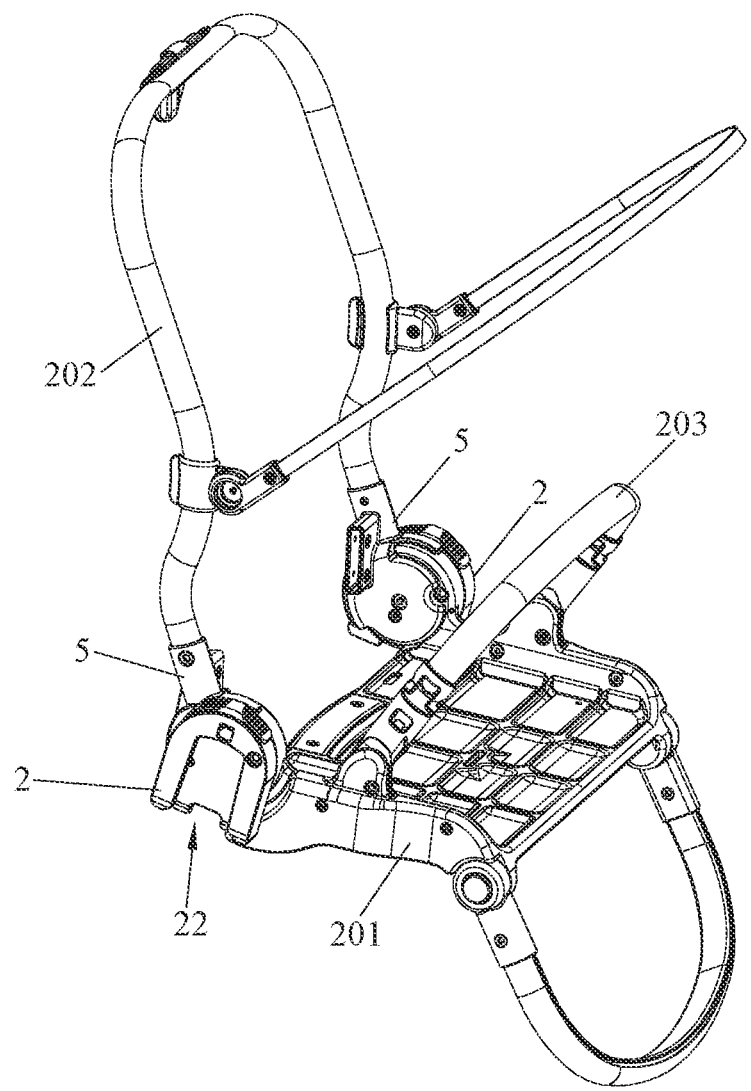
FIG. 20 is a perspective view illustrating the child seat shown in FIG. 15 with the backrest frame in an unfolded state and the connector in a first angular position relative to the seat portion.

After the backrest frame 202 has rotated an angle in the unfolding direction relative to the seat portion 201, the end 52A of the channel 52 can contact with the protruding portion 9 of the linking part 7. Subsequently, further rotation of the backrest frame 202 in the unfolding direction can urge the coupling part 1 and the seat portion 201 to rotate in unison with the backrest frame 202 relative to the connector 2 through the contact between the end 52A of the channel 52 and the protruding portion 9 of the linking part 7. This coupled rotation of the seat portion 201 and the backrest frame 202 in the unfolding direction can continue until an edge 25 of the connector 2 (better shown in FIG. 16) contacts and urges the release actuator 8 to slide toward the interior of the coupling part 1 and push the linking part 7 to rotate from the coupling-enabled state to the decoupling state so that the protruding portion 9 moves outside the channel 52 and disengages from the end 52A of the channel 52. The seat portion 201 is thereby decoupled from the backrest frame 202, and no longer rotates along with the backrest frame 202. This decoupling of the seat portion 201 from the backrest frame 22 caused by the contact of the connector 2 with the release actuator 8 can occur when the connector 2 is in the first angular position relative to the seat portion 201. While the decoupled seat portion 201 and the connector 2 remain stationary, the backrest frame 202 can then continue to rotate relative to the seat portion 201 and the connector 2 until the backrest frame 202 reaches the desired unfolded state, which causes the actuating part 51 to move and push the latching device 3 to move from the unlocking position to the locking position and engage with the connector 2. The connector 2 can be thereby locked in the first angular position relative to the seat portion 201 when the backrest frame 202 is in the unfolded state. FIG. 20 illustrates the child seat 200 with the backrest frame 202 in the unfolded state and the connector 2 locked in the first angular position relative to the seat portion 201. The linking part 7 can remain in the decoupling state with the protruding portion 9 displaced away from the channel 52 in the unfolded state of the backrest frame 202.

For folding the child seat 200, the backrest frame 202 can be rotated relative to the seat portion 201 and the connector 2 in the folding direction toward the front of the seat portion 201. As the backrest frame 202 rotates in the folding direction, the actuating part 51 can be displaced away from the latching device 3 (e.g., away from the distal end of the stem portion 33 of the latching device 3) so that the latching device 3 can be urged by the spring 4 to the unlocking position disengaged from the opening 21 of the housing 20. The connector 2 can be thereby unlocked from the seat portion 201, and the seat portion 201 can then rotate relative to the connector 2 in the folding direction until the connector 2 reaches the second angular position relative to the seat portion 201. As the seat portion 201 rotates relative to the connector 2 in the folding direction, the connector 2 can release the release actuator 8, and the spring 71 can urge the linking part 7 to move from the decoupling state to the coupling-enabled state for engaging the protruding portion 9 of the linking part 7 with the channel 52 on the coupling part 5 of the backrest frame 202.

In the aforementioned construction of the coupling mechanism 70, the linking part 7 is configured to rotate between the coupling-enabled state where the linking part 7 can engage with the coupling part 5 for movably coupling the seat portion 201 to the backrest frame 202, and the decoupling state where the linking part 7 is disengaged from the coupling part 5 for rotation of the backrest frame 202 relative to the seat portion 201. It will be appreciated, however, that other assemblies may be possible. For example, the linking part 7 may be assembled with the coupling part 1 via a sliding connection so that the linking part 7 can slide relative to the coupling part 1 between the coupling-enabled state where the linking part 7 can engage with the coupling part 5 for movably coupling the seat portion 201 to the backrest frame 202, and the decoupling state where the linking part 7 is disengaged from the coupling part 5 for rotation of the backrest frame 202 relative to the seat portion 201. In that case, the spring 71 may be configured to bias the linking part 7 toward the coupling-enabled state, and the release actuator 8 can be movably connected with the coupling part 1 so as to be movable by a contact with the connector 2 for pushing the linking part 7 to slide from the coupling-enabled state to the decoupling state.

The coupling mechanism 70 described herein can movably couple the seat portion 201 to the backrest frame 202 for facilitating unfolding of the child seat 200, and may be associated with any locking mechanisms used for locking the connector 2 in position with respect to the seat portion 201. Moreover, the coupling mechanism 70 may also be omitted in embodiments that do not need movable coupling of the seat portion 201 to the backrest frame 202.

Figure 21:
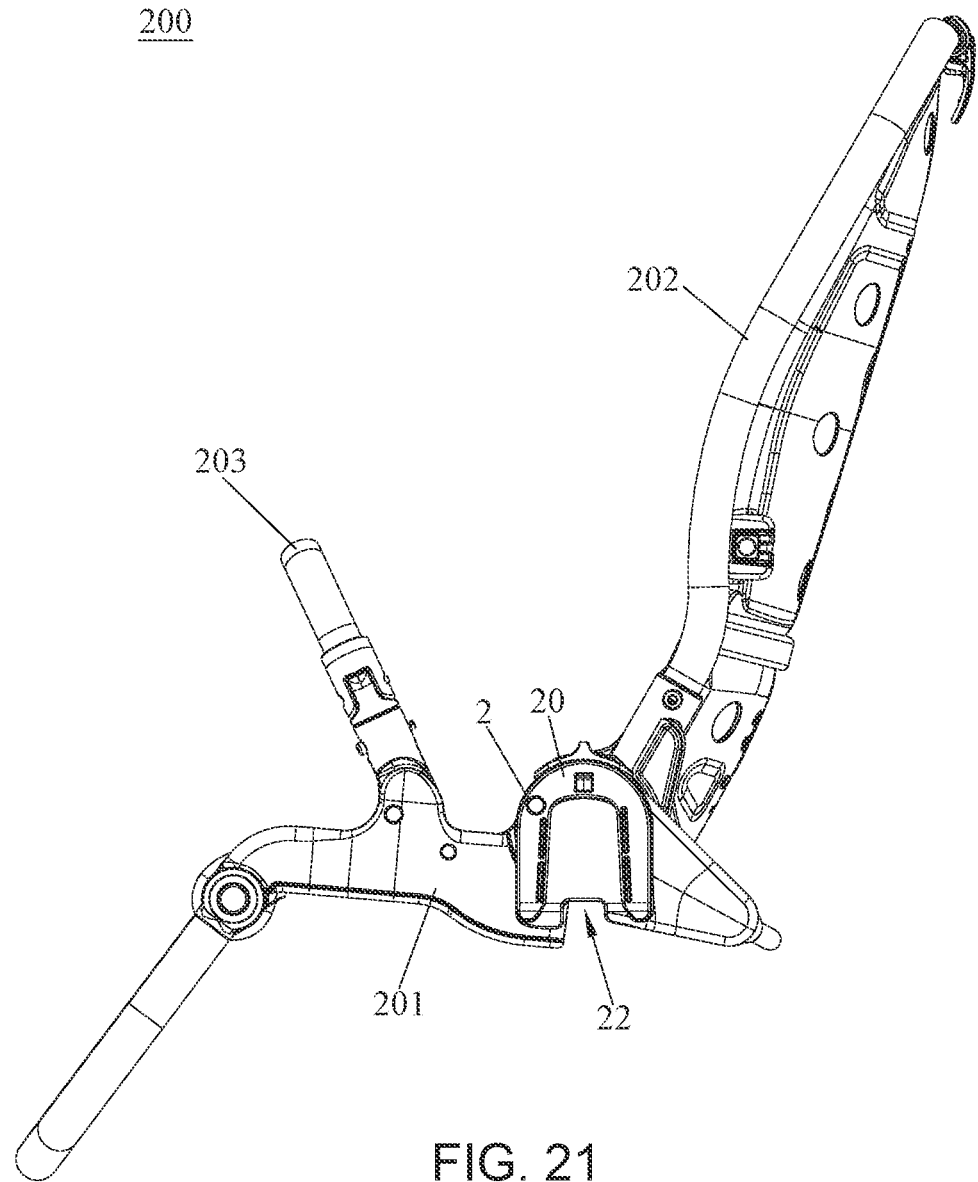
FIG. 21 is a side view illustrating another embodiment of a child seat.
Figure 22:
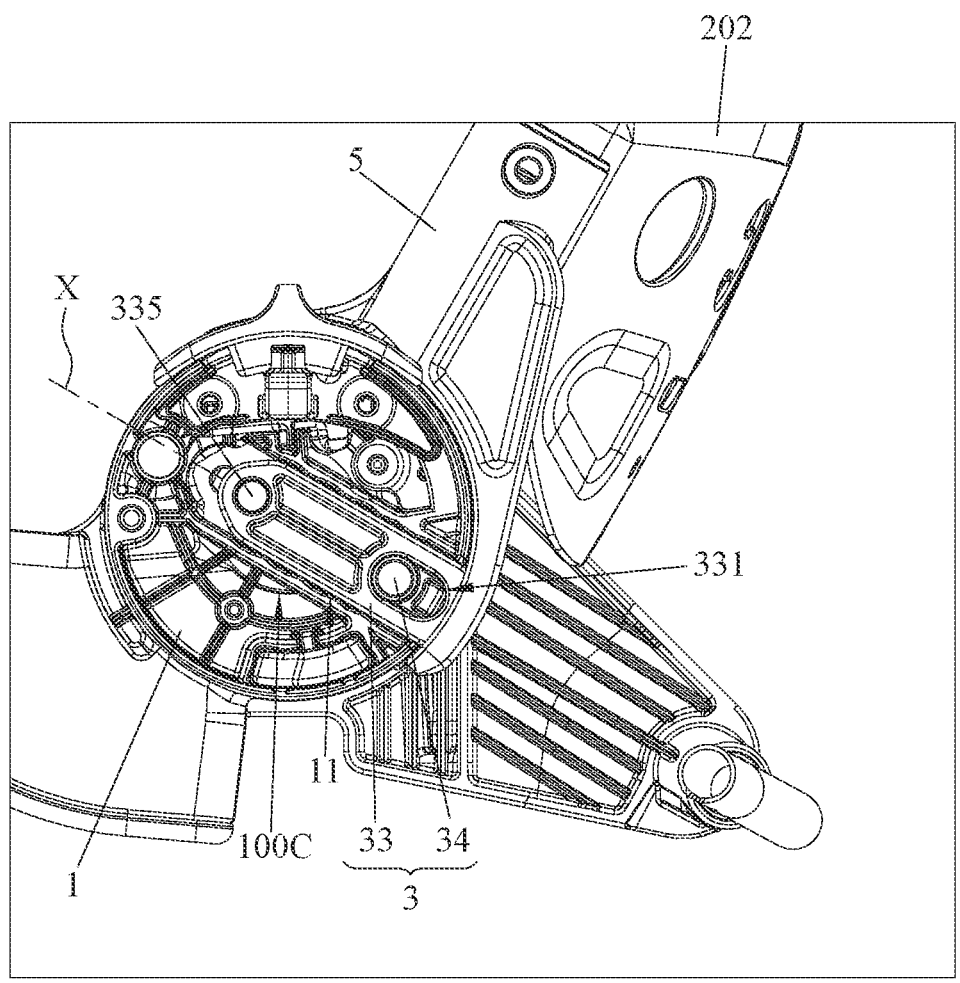
FIG. 22 is a schematic view illustrating another construction of a locking mechanism operable to lock and unlock a connector in the child seat shown in FIG. 21.
Figure 23:
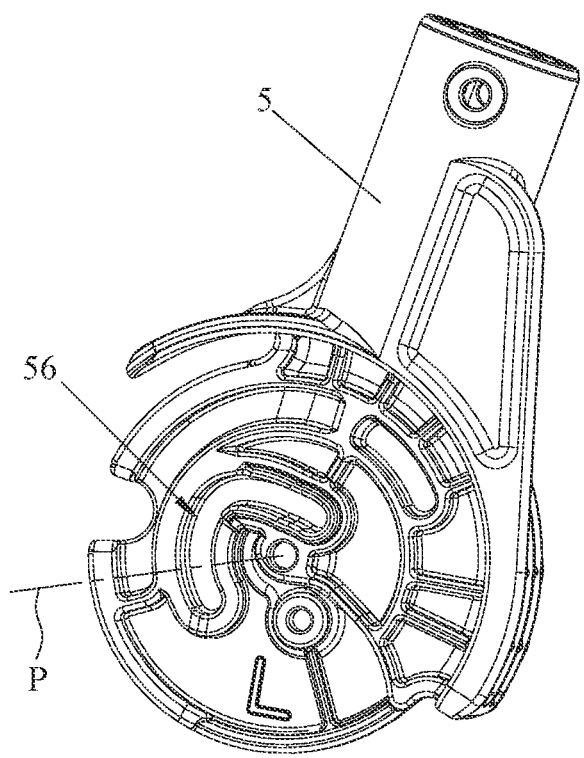
FIG. 23 is a perspective view illustrating a coupling part of a backrest frame used in the locking mechanism shown in FIG. 22.

FIGS. 21-23 are schematic views illustrating a variant construction of a locking mechanism 100C that may be used in an embodiment of the child seat 200 for locking the connector 2 with respect to the seat portion 201. The locking mechanism 100C may be provided in an embodiment of the child seat 200 that pivotally assembles the backrest frame 202 and the connectors 2 to the seat portion 201 in a similar manner as previously described. Referring to FIGS. 21-23, the locking mechanism 100C is operatively connected with the backrest frame 202, and includes the latching device 3 comprised of the stem portion 33 and the locking portion 34 that can be assembled similar to the embodiment described previously with reference to FIGS. 11-14. In the embodiment of FIGS. 21-23, the stem portion 33 can likewise slide along the axis X toward the interior of the guide slot 11 to urge the locking portion 34 to slide and protrude at a side of the stem portion 33 for engaging with the housing 20 of the connector 2, and slide along the axis X toward the outside of the guide slot 11 to urge the locking portion 34 to slide and retract toward the stem portion 33 for disengaging from the opening 21 of the housing 20. The latching device 3 thereby configured can have a locking position in which the locking portion 34 of the latching device 3 is engaged with the housing 20 of the connector 2 to lock the connector 2 in the first angular position corresponding to the unfolded state of the child seat 200, and an unlocking position in which the locking portion 34 of the latching device 3 is disengaged from the housing 20 for relative rotation between the connector 2 and the seat portion 201.

Referring to FIGS. 22 and 23, the locking mechanism 100C does not use the spring 4 and the actuating part 51 of the locking mechanism 100B, but instead movably couples the stem portion 33 of the latching device 3 to the coupling part 5 of the backrest frame 202 so that the movement of the latching device 3 between the locking and unlocking positions can be coupled to the rotation of the backrest frame 202. More specifically, the coupling part 5 can have a guide track 56, and the stem portion 33 can be fixedly connected with a pin 335 that protrudes at a side of the stem portion 33 and is guided for sliding along the guide track 56. As better shown in FIG. 23, the guide track 56 can have a curved shape, and is offset from the pivot axis P of the backrest frame 202. The stem portion 33 can be thereby coupled to the coupling part 5 of the backrest frame 202 via a sliding connection that allows to controllably drive the latching device 3 by rotating the backrest frame 202. More specifically, a rotation of the backrest frame 202 in the unfolding direction can cause relative sliding of the pin 335 in a first direction along the guide track 56 that results in the stem portion 33 sliding along the axis X toward the interior of the guide slot 11, which urges the locking portion 34 to slide and protrude at a side of the stem portion 33 for engaging with the housing 20 of the connector 2. Reversely, a rotation of the backrest frame 202 in a folding direction can cause relative sliding movement of the pin 335 in an opposite second direction along the guide track 56 that results in the stem portion 33 sliding along the axis X toward the outside of the guide slot 11, which urges the locking portion 34 to slide and retract toward the stem portion 33 for disengaging from the opening 21 of the housing 20. With this construction, the respective angular positions of the backrest frame 202 corresponding to the locking and unlocking positions of the latching device 3 may be set as desired.

Advantages of the structures described herein include the ability to provide a child seat that has connectors allowing detachable installation on a child supporting apparatus and is convenient to fold and unfold once installed on the child supporting apparatus. After the child seat is installed on the child supporting apparatus, a folding rotation of the backrest frame can cause locking mechanisms to unlock the connectors with respect to a seat portion of the child seat, and an unfolding rotation of the backrest frame can cause the locking mechanisms to lock the connectors in position relative to the seat portion. When the connectors are unlocked, the seat portion can rotate relative to the connectors for facilitating folding and unfolding of the child seat.

Realization of the child seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child seat comprising:
   a seat portion fixedly connected with a first coupling part;
   a backrest frame fixedly connected with a second coupling part, the second coupling part being pivotally connected with the first coupling part about a first pivot axis so that the backrest frame is rotatable relative to the seat portion;
   a connector pivotally connected with the seat portion about a second pivot axis spaced apart from the first pivot axis, the connector being operable to detachably engage with a corresponding structure provided on a child supporting apparatus; and
   a locking mechanism operable to rotationally lock and unlock the connector with respect to the seat portion.

2. The child seat according to claim 1, wherein the connector is pivotally connected with the first coupling part at an outer side thereof.

3. The child seat according to claim 1, wherein the connector is pivotally connected with the first coupling part at a first side thereof, and the second coupling part is pivotally connected with the first coupling part at a second side thereof opposite to the first side.

4. The child seat according to claim 1, wherein the connector has an insert opening adapted to detachably engage with a corresponding structure provided on a child supporting apparatus, and the second pivot axis is located adjacent to the insert opening.

5. The child seat according to claim 4, wherein the first pivot axis extends transversally through the insert opening, and the second pivot axis is located outside the insert opening.

6. The child seat according to claim 1, wherein the second pivot axis is located higher than the first pivot axis.

7. The child seat according to claim 1, wherein the connector and the second coupling part are pivotally connected with the first coupling part adjacent to a rear end of the seat portion.

8. The child seat according to claim 1, wherein the locking mechanism is movable to engage with the connector for rotationally locking the connector with respect to the seat portion and to disengage from the connector for rotationally unlocking the connector with respect to the seat portion.

9. The child seat according to claim 1, wherein the locking mechanism is configured to switch between a locking state and an unlocking state in response to a rotation of the backrest frame relative to the seat portion and the connector.

10. The child seat according to claim 9, wherein the locking mechanism is configured to switch to the unlocking state and rotationally unlock the connector with respect to the seat portion in response to a rotation of the backrest frame in a folding direction, and is configured to switch to the locking state and rotationally lock the connector with respect to the seat portion in response to a rotation of the backrest frame in an unfolding direction.

11. The child seat according to claim 10, wherein the backrest frame rotates toward a front of the seat portion in the folding direction.

12. The child seat according to claim 1, wherein the locking mechanism includes a latching device carried with the first coupling part, the latching device being movable relative to the first coupling part between a locking position where the latching device engages with the connector for rotationally locking the connector with respect to the seat portion and an unlocking position where the latching device disengages from the connector for rotation of the connector relative to the seat portion.

13. The child seat according to claim 12, wherein the locking mechanism further includes a spring configured to bias the latching device to the unlocking position.

14. The child seat according to claim 12, wherein the latching device includes a stem portion and a locking portion connected with each other, the stem portion being slidable along a guide slot provided in the first coupling part, and the locking portion protruding at a side of the stem portion, the connector being rotationally locked in position with respect to the seat portion by an engagement of the locking portion.

15. The child seat according to claim 14, wherein the locking mechanism further includes an actuating part that is connected with the second coupling part and is movable along with the backrest frame during rotation of the backrest frame relative to the seat portion and the connector, the actuating part contacting with the stem portion to hold the latching device in the locking position when the backrest frame is unfolded, and the actuating part being displaced away from the stem portion for movement of the latching device to the unlocking position when the backrest frame is folded.

16. The child seat according to claim 14, wherein the stem portion and the locking portion are fixedly connected with each other, or the stem portion and the locking portion are coupled to each other via a sliding connection allowing the locking portion to slide relative to the stem portion.

17. The child seat according to claim 14, wherein the stem portion is movably coupled to the second coupling part so that a movement of the latching device between the locking position and the unlocking position is coupled to a rotation of the backrest frame.

18. The child seat according to claim 1, further including a coupling mechanism operable to movably couple the seat portion to the backrest frame so that the seat portion and the backrest frame are movable in unison relative to the connector during adjustment of the backrest frame between an unfolded state and a folded state.

19. The child seat according to claim 18, wherein the coupling mechanism includes a linking part connected with the first coupling part, the linking part being movable relative to the first coupling part between a coupling-enabled state where the linking part is engageable with the second coupling part for movably coupling the seat portion to the backrest frame, and a decoupling state where the linking part is disengaged from the second coupling part for decoupled rotation of the backrest frame relative to the seat portion.

20. The child seat according to claim 19, wherein the second coupling part includes a channel, and the linking part has a protruding portion, the protruding portion being partially received in the channel in the coupling-enabled state and displaced outside the channel in the decoupling state.

* * * * *